United States Patent
Domingo et al.

(10) Patent No.: US 9,340,675 B2
(45) Date of Patent: *May 17, 2016

(54) SUSTAINABLE RANGE OF SULFUR DYES FOR TEXTILE AND PAPER DYEING

(75) Inventors: Manuel Jose Domingo, Barcelona (ES); Joan Manel Blanquera, Barcelona (ES); Yolanda Garcia, Barcelona (ES)

(73) Assignee: CLARIANT INTERNATIONAL LTD., Muttenz (CH)

( * ) Notice: Subject to any disclaimer, the term of this patent is extended or adjusted under 35 U.S.C. 154(b) by 167 days.

This patent is subject to a terminal disclaimer.

(21) Appl. No.: 14/125,043

(22) PCT Filed: Jul. 4, 2012

(86) PCT No.: PCT/EP2012/002814
§ 371 (c)(1),
(2), (4) Date: Feb. 6, 2014

(87) PCT Pub. No.: WO2013/007358
PCT Pub. Date: Jan. 17, 2013

(65) Prior Publication Data
US 2014/0173836 A1 Jun. 26, 2014

(30) Foreign Application Priority Data
Jul. 9, 2011 (EP) .................................. 11005637

(51) Int. Cl.
*C09B 61/00* (2006.01)
*C09B 49/00* (2006.01)
*D06P 1/30* (2006.01)
*D06P 3/60* (2006.01)
*D06P 1/34* (2006.01)

(52) U.S. Cl.
CPC ................. *C09B 61/00* (2013.01); *C09B 49/00* (2013.01); *D06P 1/30* (2013.01); *D06P 1/34* (2013.01); *D06P 3/6025* (2013.01)

(58) Field of Classification Search
CPC ........... C09B 49/00; C09B 61/00; D06P 1/34; D06P 3/6025; D06P 1/30
USPC .............................................................. 8/646
See application file for complete search history.

(56) References Cited

U.S. PATENT DOCUMENTS

| | | | |
|---|---|---|---|
| 1,736,014 A | 11/1929 | Plauson | |
| 4,452,822 A | 6/1984 | Shrikhande | |
| 4,892,588 A * | 1/1990 | Dilling | ................ C09B 67/0086 106/501.1 |
| 5,908,650 A | 6/1999 | Lenoble et al. | |

FOREIGN PATENT DOCUMENTS

| | | |
|---|---|---|
| EP | 0741168 | 11/1996 |
| GB | 187301489 | 0/1873 |
| JP | 158409 | 5/1943 |
| JP | 177927 | 9/1949 |
| JP | 180644 | 6/1950 |
| JP | H-02104774 A | 4/1990 |
| JP | 08337733 H | 12/1996 |
| JP | 2010279305 A | 12/2010 |
| MX | 2008/006905 A | 11/2009 |

OTHER PUBLICATIONS

English translation of Parer on organic sulfides, Presented to the Mulhouse indestrial (1874).*
International Search Report for PCT/EP2012/002814 Mailed Aug. 3, 2012.
"Trial Preparation of Sulfur Chestnut Brown Dye from Alkaline Lignin", Fujian Light Industry Science and Technology, No. 1, 1974.

* cited by examiner

*Primary Examiner* — Elsa Elhilo
(74) *Attorney, Agent, or Firm* — MMWV IP, LLC

(57) ABSTRACT

The invention refers to the manufacturing of a novel group of sulfur dyes in which are used, as raw material, different kind of natural "biomass", usually existing in the nature, and transforming them into soluble dyestuffs, capable to dye textile fibers, preferably cellulose fibers and derivatives, as cotton, viscose, paper, tencel, with high strength and fast color properties. For this purpose, the concept "Biomass", is defined as the residual product obtained from the usual human crop activities, in agricultural and forestry sectors.

20 Claims, No Drawings

SUSTAINABLE RANGE OF SULFUR DYES FOR TEXTILE AND PAPER DYEING

CROSS REFERENCE TO RELATED APPLICATIONS

This application is a §371 National Stage Application of PCT/EP2012/002814, filed Jul. 4, 2012, which claims priority to European Application No. 11005637.1, filed Jul. 9, 2011.

BACKGROUND OF THE INVENTION

Field of the Invention and Description of Related Art

Sulfur dyes are commonly known for dyeing textile cellulosic materials or blends of cellulosic fibers with synthetic fibers. The range of colors covers black, blue, olive, and brown, but the hues are dull compared with other dye classes. The first sulfur dyes were produced in 1873 by heating organic cellulose-containing material, such as wood sawdust, humus, bran, cotton waste, and waste paper with alkali sulfides and polysulfide (Brit. Pat. 1489; E. Croissant and L. M. F. Bretonniere, Bull. Soc. Ind. Mulhouse 44, 465 (1874).

According to Brit. Pat. 1489, said heating was performed without any intermedium and without preliminary preparation or conversion before contact with the sulfides. However, these dyes are reported to be dark and hygroscopic, had a bad color, were toxic and had a bad smell (Kirk-Othmer Encyclopedia of Chemical Technology, Sulfur Dyes, pg. 1-22, Wiley Online Library, published 4 Dec. 2000).

Nowadays it is well-known that a group of colors, as some browns, olives, greys, oranges and yellows can be obtained by mixing sulfur, sulfides and/or polysulfides with different well defined organic aromatic compounds and reacting these mixtures at high temperatures. Theses raw materials come from different benzene derivatives, the most important being: amino compounds such as m-phenylenediamine, m-toluenediamine, p-toluidine, aniline, p-phenylenediamine; amino-nitro compounds such as p-nitroaniline, amino-nitrotoluene; phenol compounds such as beta-naphthol, p-aminophenol, hydroquinone.

All these organic compounds that are used today come from petroleum aromatic chemistry, and most of them are considered as toxicologically harmful, some of them also potentially mutagenic and carcinogenic.

Additionally, the petroleum chemistry contributes significantly to the global warming and furthermore, the chemical operations necessary to purify these intermediates, in order to be commercialized and used in the whole dye manufacturing industry, requires lots of energetic resources and generates also additional by-products.

Another present days ecological concept is the cultivation of real dye plants. This, however, would require about 100 million tons of dye plants to dye the total world cotton and wool. The surface necessary to cultivate is estimated to be approximately 100 to 200 million hectares, which accounts for 10 to 20% of the global effort to cereals. The effect of such kind of monocultures would be disastrous for nature.

The human crop activities in forests and in agriculture generate large amounts of vegetal wastes. These wastes from forestry and agricultural crops represent thousands of tons of natural vegetal products called "biomass" that in some cases can be used as energy fuel, and in other cases disposed as wastes.

The object of the present invention is to develop a manufacturing system which is able to value and transform part of these "biomass" products into dyestuffs.

These dyestuffs should have affinity for textiles and paper, preferably cellulose fibers, with good general fastness properties, e.g. wet, rub and light fastness. However, the greatest interest and main characteristic of this invention comes from the fact that said vegetal biomass collaborates thereby in the sustainability of the environment, avoiding the use of aromatic toxic compounds, and reducing the $CO_2$ generation in comparison with present known procedures of the petroleum aromatic chemistry.

It was found surprisingly that this object can be achieved by transforming pretreated vegetal biomass, especially waste biomass, into an aqueous sulfur dye solution.

By this reason from now we would name these dyes as "EARTH—color—S".

"EARTH" because this word describes the origin of the biomass which is used as starting raw material, and also because the shades of the obtained dyes are in line with the colors of the earth nature.

"color" because the final obtained product has dyeing properties.

"S" because the other component that is used in the synthesis, in order to form the final polymeric dyestuff, is basically sulfur, a sulfide and/or polysulfides.

Such dyes coming from the use of natural vegetal wastes can be considered as "sustainable dyes".

SUMMARY

A subject of the present invention is a process for manufacturing dyestuffs comprising the steps of
(i) Providing vegetal biomass, preferably waste biomass, more preferably biomass coming from industrial agricultural wastes;
(ii) Pretreating said vegetal biomass with an aqueous acidic medium;
(iii) Neutralizing the pretreated vegetal biomass and/or isolating the pretreated vegetal biomass in form of a press-cake;
(iv) Mixing the pretreated vegetal biomass obtained in (iii) with a sulfurization agent selected from the group consisting of sulfur, sulfide, polysulfide and a combination thereof;
(v) Heating said mixture to a temperature of between 120 and 350° C. for at least 2 hours;
(vi) Dissolving the mixture obtained in step (v) in aqueous medium and optionally removing undissolved solid particles.

DETAILED DESCRIPTION OF A PREFERRED EMBODIMENT (i) On principle, the biomass can be any kind of plant products, especially from forest or agricultural crop activities or from marine sources. It is difficult to define all these plant products in chemical terms, but roughly the following groups can be identified:
(a) Plant products containing from about 3 to 50% by weight, based on dry mass, of lignine, further components can be polysaccharides, e.g. cellulose. Examples are biomass sources obtained from wastes of forestry activities, e.g. tree barks, wood chips, wood pellets, saw dust, cotton residues, or from agricultural crop activities, such as shells from dry fruits, preferably nutshells, e.g. hazelnut shells, walnut shells, coconut shells, cashew nut shells, pistachio shells, pine fruit shells, and almond shells, further cereals, fruit pits, such as date pits, cherry pits, olive pits.

(b) Plant products, mostly related to fruits, containing phenols and polyphenols in an amount from about 5 to 50% by weight, based on dry mass. Further components may be terpenes, phenolic acids, stilbenes, lignans, flavonoids, tannins, lipids, proteins. Examples are olive pulp, olive orujillo, pips flour, rice residues, grape marc, sun flower pulp, soybean pulp, canola bagasse, herbs ground, corncob and coffee ground.

(c) Plant products from marine sources, such as algae, e.g. brown, red and green algae. Algae usually contain as main components alginic acid, xylans, mannitol, proteins, tannins depending on the algal species.

In a further preferred embodiment of the invention, the biomass source is a combination of groups (a) and (b), for example a grape residue containing the peel, the seeds and parts of the branches.

This list does not exclude any other biomass waste that can be obtained as a result of agricultural activities, which, on the other hand, will depend on the different country activities and soil characteristics.

Preferred biomass is obtained from alimentary crops as specified above, especially from their wastes as shells of dry fruits, e.g. nutshells, fruit pits and coffee ground.

Depending on the size of the biomass pieces it can be advantageous to reduce its size by an adequate operation, e.g. by slicing, chopping, pelletizing, cutting or milling, before introducing into the process of the present invention.

(ii) The pretreatment of the vegetal biomass is expediently carried out in an acidic aqueous medium having a pH of below 5, e.g. between 0 and 4. Preferred acids can be inorganic acids such as hydrochloric acid, phosphoric acid, nitric acid or sulfuric acid; organic acids such as formic acid, acetic acid, lactic acid or citric acid; and Lewis acids such as boric acid, aluminum sulfate, aluminum chloride or iron sulfate. Preferred is sulfuric acid.

Preferred is an acidic aqueous medium of 2 to 98%, more preferably of 10 to 85%, especially between 20 and 70%, strength by weight concentration of the acid in water.

The amounts by weight between the biomass and the acidic aqueous medium can vary within wide limits, e.g. from 1:10 to 10:1, preferably between 1:5 and 5:1, more preferably between 1:3 and 1:1.

The temperature of said pretreatment is expediently between 20° C. and boiling point at 1 atm, preferably between 40 and 95° C., more preferably between 70 and 85° C. The duration of said pretreatment is expediently between 30 minutes and 6 hours, preferably between 2 and 4 hours.

(iii) After the reaction time has been completed, the obtained pretreated biomass can be directly neutralized with an inorganic or organic alkaline compound and/or preferably the pretreated biomass is separated by any type of filtration, the obtained wet press-cake washed and pasted in water, optionally neutralized with an inorganic or organic alkaline compound, and then sulfurized according to step (iv).

Alkaline compounds for neutralization can be a metal hydroxide or a basic salt, such as sodium hydroxide, potassium hydroxide, sodium carbonate, potassium carbonate, or a basic amino compound, such as ammonia, lower alkylamines, e.g. methyl amine, ethylamine, and lower alkanolamines, e.g. monoethanolamine.

(iv) For sulfurization, the resulting pretreated biomass from step (iii) is combined, preferably under stirring or any other kind of agitation, with sulfur, alkali sulfide, alkali polysulfide or a combination thereof, hereinafter called sulfurization agent.

Sulfur can be any known modification of elementary sulfur, preferred is rhombic alpha sulfur.

Preferred sulfides are metal sulfides, most preferred are alkali metal sulfides, such as sodium sulfide, sodium hydrogen sulfide, potassium sulfide and potassium hydrogen sulfide.

Preferred polysulfides are alkali metal polysulfides arising by treatment of alkali sulfide with elemental sulfur, e.g. sodium polysulfide and potassium polysulfide.

The sulfides and polysulfides can be introduced in solid form or as aqueous solution.

The relative amount by weight between the sulfurization agent and the pretreated vegetal biomass (calculated on dry weight) can vary between 1:10 to 10:1, preferably between 1:1 to 10:1, more preferably between 1:1 and 5:1, even more preferably between 1:1 and 3:1, most preferably between 1:1 and 2.5:1.

Of course, it is also possible to use less sulfurization agent than indicated before, however, a part of the biomass would remain unreacted, thus rendering the process less economic.

(v) The resulting mixture of step (iv) is heated to temperatures between 120 and 350° C., preferably between 150 and 320° C., more preferred between 160 and 300° C., most preferred between 180 and 270° C., for at least 2 hours, preferably for 6 to 48 hours, more preferred for 10 to 30 hours.

In a preferred embodiment, the reaction is done in bake-pot reactors, also called dry way reactors, wherein at the beginning the reaction mass is still liquid and can be stirred, then during the heating step water evaporates off and the mass becomes a solid and the stirring is automatically stopped. The reaction may continue while heating the reactor walls. During the reaction $H_2S$ is released and can be collected in an alkaline scrubber. This gas formation also helps to have a good heat transfer inside the solid mass.

During this step, it is supposed that sulfur interacts with the pretreated biomass material, introducing active groups that will provide for good water solubility along with cellulose affinity, and of course, the chromophoric final dye-shade. One of the facts that demonstrates that sulfur interacts with the biomass is the $H_2S$ formation where the sulfur releases two hydrogen atoms from the organic biomass molecule and replacing them with a sulfur atom. This happens in dry sulfurizations as well as in wet sulfurizations and independently from the pH.

Basically the heating conditions and time provide for a good "cooking" of the biomass which effect is more related with the strength of the final dye, the solubility and dyeing properties. The color shade is much more linked to the kind of biomass used. Normally more rigorous heating conditions lead to a deeper shade with higher strength. Too high temperatures, however, could "burn" the product, so it is experimental to find the right temperatures and time for the best performance in terms of final dye yield and desired shade.

(vi) At the end of the sulfurization reaction, the obtained product is dissolved in water or in alkaline aqueous medium, optionally under heating. If present, solid particles are removed, e.g. by filtration, decantation or any other suitable measure. If more alkaline agent was present than $H_2S$ formed the final product is alkaline. If the water evaporated off during the sulfurization, the product is a solid.

As alkaline pH favors the solubilization of the sulfurized solid product, it is preferred that the aqueous solution prepared therefrom has an alkaline pH, preferably above 8, more preferably above 9, e.g. between 8 and 14, more preferably between 9 and 13.

Once the solubilization has been finished, there is obtained a liquid aqueous solution of the solubilized "biomass" that we could name as "liquid EARTH—color—S".

As one of the objects of the present invention is to avoid the formation of toxic by-products, especially the free sulfide content in the final product should be as low as possible.

This object can in many cases be fulfilled simply by adjusting the amount of the sulfurization agent relative to the amount of biomass within the limits specified above.

In order to reduce the free sulfide amount it can also be advantageous to add an oxidizing agent which is able to react with sulfide in alkaline medium, such as air, oxygen, peroxides or chlorites, to the aqueous alkaline solution containing the solubilized sulfurized product. This oxidation is preferably done at temperatures between 20 and 70° C.

Even today little is known about the chemical structure of sulfur dyes and therefore they can only be classified according to its manufacturing process and the nature of the starting materials.

Therefore, another subject of the present invention is an aqueous solution of a dyestuff prepared by the process described before.

Contrary to state-of-the-art sulfur dyes the aqueous dyestuff solution of the present invention is devoid of bad odor, and contains free sulfide ($S^{2-}$ ions, $HS^-$ ions and $H_2S$) in an amount of less than 3% by weight, preferably from 0.1% or less to 2.5% by weight, based on the total weight of the aqueous solution obtained in step (vi).

The aqueous dyestuff solution of the present invention has an alkaline pH, preferably above 8, more preferably above 9, e.g. between 8 and 14, more preferably between 9 and 13.

As the final dyestuff product normally is a water solubilization product of the solid material obtained after the sulfurization step, the most effective dilution can vary depending on the biomass origin and the sulfurization conditions, but in general it is advantageous to obtain the maximum concentrated dye solution possible which was found to be about 40 to 65%, preferably 40 to 55%, by weight, based on the total weight of the dyestuff solution. Lower concentrations, such as 10 to 40%, especially 20 to 30% by weight, based on the total weight of the dyestuff solution, may sometimes be preferred in order to assure stability to crystallization.

Another advantage of the present dye solution is that the product resulting from step (v) is very well soluble in water or alkaline aqueous solution and is almost free of insoluble solids and ready to be used in dyeing processes. This is due to the particular pretreatment of step (ii) that transforms practically all the biomass into soluble products at the end of the sulfurization. Still another advantage of the present dye solution is that the hitherto usual mercaptane odor is practically eliminated which is also believed to be due to the specific pretreatment step prior to sulfurization.

To have a ready-for-use liquid solution is much more interesting than a solid mass provided by state-of-the-art methods as present application systems use aqueous dye solutions, especially continuous applications such as Denim for Jeans, Pad-Steam, Pad-Ox or Pad-sizing-Ox. Another advantage to have low sulfide content in these solutions is that the product itself can be GOTS approved and considered as non-toxic.

The aqueous dye solution of the present invention can be used to dye cellulose material, such as cotton, paper, viscose and cellulose derivatives, such as Tencel® or Lyocel®, linen or bamboo, expediently by using the currently known "sulphur dye" dyeing systems such as exhaust dyeing, Pad-Steam, Pad-Ox, Denim, Pad-sizing or Pad-sizing-Ox.

The cellulose dyeing is usually made under alkaline-reducing conditions. The exact dyeing conditions depend on the above mentioned dyeing systems and are known to the skilled artisan. The reduction conditions can be preferably achieved by using sugars, such as glucose, dextrose or fructose, as reducing agents, although other reducing agents such as hydrosulfite, sulfides, polysulfides, thiourea dioxide, sodium borohydride or hydroxyacetone, could technically be used.

Once the reduction dyeing step has been finished, the application process is followed by an oxidative fixation step using oxidants such as peroxides, percarbonates, persulfates or bromates, and optionally also cationic fixing agents.

The different steps of a continuous dyeing with a sulfur dye usually comprise:

1. Dyeing

The dyestuff is mixed with auxiliaries like wetting agents, sequestering agents and reducing agents, and with alkali, if necessary. The dyeing is made by passing and soaking the fabric into the dye solution, this dye solution may have a temperature of 70 to 80° C. in case of pad or denim application. In case of Pad-Steam application the padding is done at room temperature and after that the temperature is increased until 100° C. by steam for a minute, whereby the dye diffuses into and reacts with the fiber.

2. Washing

Formerly, after the padding or padding-steam, a washing step was performed in order to eliminate non-fixed dyestuff and let only the reacted and fixed dye on the fiber. Nevertheless recent improvements in application technology in order to save water have developed systems like Pad-Ox, Pad-Steam-Ox, Denim Ox where the washing step is eliminated and the fabric after the first padding is directly soaked and reacted in the fixative bath.

3. Fixation a) With previous washing:
  Normally in this case it is enough to use an oxidant such as alkali bromate/acetic acid, alkali persulfate/carbonate or hydrogen peroxide/acetic acid, in order to oxidize the free thiol groups of the dye to sulfur bridges which transforms the previously soluble dye (in alkali and reducing media) into an insoluble pigment (in acidic and oxidant media).

b) Without previous washing:
  In order to assure that the non-fixed dye that has not been eliminated by a washing step is not discharged in the fixation bath a cationic agent which blocks and insolubilizes the dye inside the fiber material is used additionally to the acid and oxidant.

4. Special Fixation (Pad-Sizing-Ox)

This is a special case basically used in Denim application where after the dyeing there is no washing and the fixation is done together with the sizing using the acid, the oxidant and preferably a cationic sizing agent composition.

Still another subject of the present invention is a cellulose material or cellulose-containing material dyed with an aqueous dye solution as described before. Cellulose or cellulose-containing materials are for example fibers, yarns, woven fabrics, knitwear, garments, in particular for apparel and denim articles, further paper and cardboard articles.

In a preferred embodiment, the dyed cellulose material is a cotton textile material, especially a Denim jeans, dyed in brown or olive shades with an aqueous sulfur dye solution prepared according to the process of the present invention, wherein the vegetal biomass comes from shells of dry fruits, in particular shells from nuts, e.g. hazelnuts, walnuts, almonds, or fruit pits, e.g. olive pits, or from coffee ground. In these embodiments the preferred dyeing methods are selected from the group consisting of exhaust dyeing, Pad-Steam, Pad-Ox, Denim, Pad-sizing and Pad-sizing-Ox, especially Denim.

In the following examples, percentages mean percent by weight, unless indicated otherwise.

Example 1a 60 g of milled almond shells are mixed with 180 g of an aqueous sulfuric acid solution which concentration was adjusted to 55% strength by weight.

The mixture is heated to 70° C. maintaining this temperature during 3 hours, afterwards is cooled to 50° C., diluted with 250 g of water and filtered through a filter press. The collected press-cake is washed with 400 ml of water.

The appearance of this press-cake is much darker than the starting biomass material. The press-cake is mixed with 50 g of water and 20 g of caustic soda (50% strength by weight) assuring that the pH is alkaline, then 55 g of sodium sulfide hydrate (60% by weight $Na_2S$) and 70 g of sulfur are added.

This mixture is heated slowly during 8 hours from 150° C. until 260° C. and this last temperature is maintained during 14 hours.

The obtained powder is dissolved with 250 g of water and 10 g of caustic soda (50% strength by weight), and heated at 105-107° C. for 30 minutes.

Finally 400 g of a liquid solubilized dyestuff are obtained which is practically free of insoluble particles and with a sulfide content lower than 3%.

Example 1b 100 g of the aqueous solution as obtained in Example 1a are diluted with 500 g of water and mixed with 10 g of glucose, 10 g of sodium carbonate and 5 g of a wetting agent. The mixture is diluted with water until 1000 g and heated at 70° C. A piece of cotton fabric is soaked during 15 seconds in the above prepared solution and, after 1 minute of air oxidation, is washed and then soaked in a solution of sodium bromate and acetic acid (2.3 g/l of sodium bromate and 10 g/l of Acetic acid 80%) and washed.

A brown dyeing is obtained with a significantly bluer and greener shade than the one obtained in Example 3b of the yet unpublished European Patent Application 11004370.0 wherein the same biomass is used, but a different pretreatment as described therein, indicating that the way of pretreatment determines the final sulfur dye constitution.

Example 2a 60 g of almond shells are mixed with 75 g of acetic acid (80% strength by weight) and 50 g of water. The mixture is refluxed at boiling point during 4 hours, then 90 g of caustic soda (50% strength by weight) are added to neutralize the acid.

Afterwards 70 g sodium sulfide hydrate (60% by weight $Na_2S$) and 70 g of sulfur are added to the suspension.

The mass is heated until 250° C. in 6 hours and then maintained at this temperature for additional 15 hours The obtained powder is dissolved with 350 g of water and boiled for 30 minutes, the final liquid dye solution is adjusted with water until 500 g.

Example 2b

A fabric dyed with the dyestuff of Example 2a using the same recipe as in Example 1b gives a brown shade less bluish and greenish that the one obtained in Example 1b.

Example 3a 60 g of a mixture of milled 90% almond shells and 10% hazelnut shells are mixed with 160 g of an aqueous sulfuric acid solution of 61% strength by weight. The mixture is heated to 80° C. maintaining this temperature for 5 hours, afterwards is cooled to 50° C., diluted with 300 g of water and filtered through a filter press. The collected press-cake is washed with 400 ml of water.

The appearance of this press-cake is much darker than the starting biomass material.

The press-cake is mixed with 50 g of water and 25 g of monoethanolamine assuring that the pH is alkaline, then 60 g of sodium sulfide hydrate (60% by weight $Na_2S$) and 95 g of sulfur are added.

This mixture is heated slowly during 8 hours from 150° C. until 265° C. and this last temperature is maintained for 14 hours.

The obtained powder is dissolved in 250 g of water and 10 g of caustic soda (50% strength by weight), and heated at 105-107° C. for 30 minutes.

Finally 400 g of a liquid solubilized dyestuff are obtained which is practically free of insoluble particles and with a sulfide content lower than 3%.

Example 3b

The dyeing with the sulfur dye obtained in Example 3a using the recipe described in Example 1b shows a higher yield (135%) and a shade more reddish and yellowish compared to the dyeing obtained in Example 1b.

Example 4a 90 g of sulfuric acid 98% are mixed with 50 g of ice in order to prepare a diluted sulfuric acid solution of 63% strength by weight at 45 to 50° C. 63 g of olive pits are mixed with this solution and maintained with stirring at 45° C. for 5 hours.

Then 300 g of water are added and the obtained suspension is filtered and washed to remove the excess of acid.

The obtained wet press-cake is mixed with 60 g of water and 20 g of caustic soda, heated at 100° C. for 30 min in order to neutralize the reaction mass.

Afterwards, 65 g of sodium sulfide (60% by weight $Na_2S$) and 65 g of sulfur are added. This mixture is heated slowly during 8 hours from 150° C. until 260° C. and this last temperature is maintained for 16 hours.

The obtained powder is dissolved in 250 g of water and 10 g of caustic soda (50% strength by weight), and heated at 105-107° C. for 30 minutes.

Finally 400 g of a liquid solubilized dyestuff are obtained which is practically free of insoluble particles and with a sulfide content lower than 3%.

Example 4b

A fabric dyed with the dyestuff of Example 4a using the same recipe as in Example 1b gives a brown shade very similar in strength and shade as the one obtained in Example 1a.

Example 5a 60 g of a mixture of milled almond shells (90%) and hazelnut shells (10%) are mixed with a solution of 15 g FeSO$_4$.2H$_2$O dissolved in 150 g of water.

The mixture is heated under reflux for 4 hours, afterwards is cooled to 80° C., neutralized by adding 20 g of water and 20 g of caustic soda 50%, and heated at 100° C. for another additional 1 hour.

Then, the obtained mass is directly mixed with 65 g of sodium sulfide (60% by weight Na$_2$S) and 65 g of sulfur. This mixture is heated slowly evaporating the excess of water during 8 hours from 150° C. until 265° C. and this last temperature is maintained for 14 hours.

The obtained powder is dissolved in 250 g of water and 10 g of caustic soda (50% strength by weight), sodium sulfhydrate (43% strength by weight) and heated at 105-107° C. for 30 minutes.

Finally 450 g of a liquid solubilized dyestuff are obtained which is practically free of insoluble particles and with a sulfide content lower than 3%.

Example 5b

The dyeing with the sulfur dye obtained in Example 5a using the recipe described in Example 1b shows a lower yield (80%) and a shade more greenish and bluish compared with the dyeing obtained in Example 3b of the yet unpublished European Patent Application 11004370.0 wherein the same biomass is used, but a different pretreatment as described therein indicating that the way of pretreatment determines the final sulfur dye constitution.

The shade, however, is less greenish and bluish than the shade obtained in Example 1a where sulfuric acid is used as the acid compound in the pre-treatment.

Example 6

60 g of dried and milled red algae are mixed with 400 g of water and 50 g of sulfuric acid 98% strength by weight.

The mixture is heated to 100° C. and boiled under reflux for 4 hours.

Then the mixture is cooled to 50° C. and neutralized with 50 g of caustic soda until pH 10.

To this mixture are added:

80 g of sodium sulfide (60% Na$_2$S) and 80 g of sulfur. This mixture is heated slowly until 260° C. evaporating the excess of water.

At the end of the reaction, the solid mass is cooled, and 184 g of a dark powder are obtained which is dissolved in 430 g of water, 8 g of caustic soda and 20 g of aqueous sodium hydrogen sulfide 43% and heating at 100° C. during 45 minutes. 650 g of a greenish aqueous liquid solution is obtained which dyes cotton, using the usual methods, e.g. according to Example 1b, with an orange brown shade.

The invention claimed is:

1. A process for manufacturing a dyestuff comprising:
   (i) providing vegetal biomass;
   (ii) pretreating said vegetal biomass with an aqueous acidic medium;
   (iii) neutralizing pretreated vegetal biomass and/or isolating pretreated vegetal biomass in form of a presscake;
   (iv) mixing pretreated vegetal biomass in (iii) with at least one sulfurization agent selected from the group consisting of sulfur, sulfide, and polysulfide to form a mixture;
   (v) heating said mixture to a temperature of from 120° C. to 350° C. for at least 2 hours; and
   (vi) dissolving the mixture in aqueous medium and optionally removing undissolved solid particles.

2. The process as claimed in claim 1, wherein the vegetal biomass is a plant product from forest and/or agricultural crop activity and/or from marine source.

3. The process as claimed in claim 1, wherein the vegetal biomass is at least one selected from the group consisting of plant products comprising from about 3% to 50% by weight, based on dry mass, of lignin, plant products comprising from about 5% to 50% by weight, based on dry mass, of phenols and polyphenols, a mixture of these plant products, and marine plants.

4. The process as claimed in claim 1, wherein in (ii), the pretreating of the vegetal biomass is carried out in an acidic aqueous medium having a pH not more than 5.

5. The process as claimed in claim 1, wherein in (ii), the amount by weight between the biomass and the acidic aqueous medium is from 1:10 to 10:1.

6. The process as claimed in claim 1, wherein in (ii), the acidic aqueous medium comprises an acid selected from the group consisting of hydrochloric acid, sulfuric acid, phosphoric acid, nitric acid, formic acid, acetic acid, lactic acid, citric acid and a Lewis acid.

7. The process as claimed in claim 1, wherein the temperature of the pretreating is from 40° C. to 95° C.

8. The process as claimed in claim 1, wherein the duration of the pretreating is from 30 minutes to 6 hours.

9. The process as claimed in claim 1, wherein relative amount by weight between the sulfurization agent and the vegetal biomass after said pretreating, calculated on dry weight, is from 1:10 to 10:1.

10. An aqueous solution of a dyestuff prepared by the process as claimed in claim 1.

11. The solution as claimed in claim 10, comprising free sulfide in an amount of not more than 3% by weight, based on total weight of the aqueous solution.

12. An aqueous solution as claimed in claim 10, capable of being used for dyeing cellulose material and/or cellulose-containing material.

13. A cellulose material and/or cellulose-containing material dyed with an aqueous solution as claimed in claim 10.

14. The cellulose material and/or cellulose-containing material as claimed in claim 13, comprising a cotton textile material.

15. The cellulose material and/or cellulose-containing material as claimed in claim 14, wherein the cotton textile material comprises Denim jeans, dyed in brown and/or olive shade, and wherein the vegetal biomass is from shell of dry fruit, fruit pits and/or from coffee ground.

16. An aqueous solution as claimed in claim 11, capable of being used for dyeing cellulose material and/or cellulose-containing material.

17. A cellulose material and/or cellulose-containing material dyed with an aqueous solution as claimed in claim 11.

18. The process of claim 1, wherein the at least one sulfurization agent is sulfur.

19. The process of claim 1, wherein the at least one sulfurization agent is sulfide.

20. The process of claim 1, wherein the at least one sulfurization agent is polysulfide.

* * * * *